US00RE51080E

(19) United States
(12) Reissued Patent
Hirano et al.

(10) Patent Number: US RE51,080 E
(45) Date of Reissued Patent: Oct. 20, 2026

(54) VIDEO CAMERA

(71) Applicant: SONY CORPORATION, Tokyo (JP)

(72) Inventors: Shinsaku Hirano, Kanagawa (JP); Koichi Maeyama, Kanagawa (JP); Rui Morisawa, Kanagawa (JP); Tokusuke Tsujimoto, Kanagawa (JP); Koji Izumi, Kanagawa (JP)

(73) Assignee: SONY CORPORATION, Tokyo (JP)

(21) Appl. No.: 29/924,444

(22) Filed: Jan. 18, 2024

Related U.S. Patent Documents

Reissue of:
(64) Patent No.: Des. 950,625
Issued: May 3, 2022
Appl. No.: 29/662,441
Filed: Sep. 5, 2018

(30) Foreign Application Priority Data

Mar. 5, 2018 (JP) ..... D2018-004593

(51) LOC (15) Cl. ..... 16-05
(52) U.S. Cl.
USPC ..... D16/219; D16/202
(58) Field of Classification Search
USPC ..... D16/200, 202, 208, 218, 219
CPC ..... G03B 17/02; G03B 19/04; G03B 17/56; G03B 17/04; G03B 15/03; G03B 17/14; H04N 5/2251; H04N 5/2252; H04N 5/2253; H04N 5/2254
See application file for complete search history.

(56) References Cited

U.S. PATENT DOCUMENTS

D438,552 S * 3/2001 Sumita ..... D16/202
D541,325 S * 4/2007 Sumita ..... D16/202
D561,800 S 2/2008 Sadatsuki
D598,941 S * 8/2009 Tanifuji ..... D16/202
D657,409 S 4/2012 Miyashita
D676,888 S * 2/2013 Hayashi ..... D16/202
(Continued)

FOREIGN PATENT DOCUMENTS

JP 2001-331132 A 11/2001

OTHER PUBLICATIONS

Office Action issued in Japanese Application No. D2020-009391, dated Apr. 16, 2021.

*Primary Examiner* — Philip S Hyder
(74) *Attorney, Agent, or Firm* — Michael Best and Friedrich LLP

(57) CLAIM

The ornamental design for a video camera, as shown and described.

DESCRIPTION

FIG. 1 is a top, front and left side perspective view of a video camera showing our new design;
FIG. 2 is a top, front and right side perspective view thereof;
FIG. 3 is a bottom, front and right side perspective view thereof;
FIG. 4 is a front elevational view thereof;
FIG. 5 is a rear elevational view thereof;
FIG. 6 is a left side elevational view thereof;
FIG. 7 is a right side elevational view thereof;
FIG. 8 is a top plan view thereof; and,
FIG. 9 is a bottom plan view thereof.
The broken lines depict portions of the video camera in which the design is embodied that form no part of the claimed design. The dot-dash broken lines denote the boundary of the claim and form no part of the claimed design.

1 Claim, 9 Drawing Sheets

Figure 1:
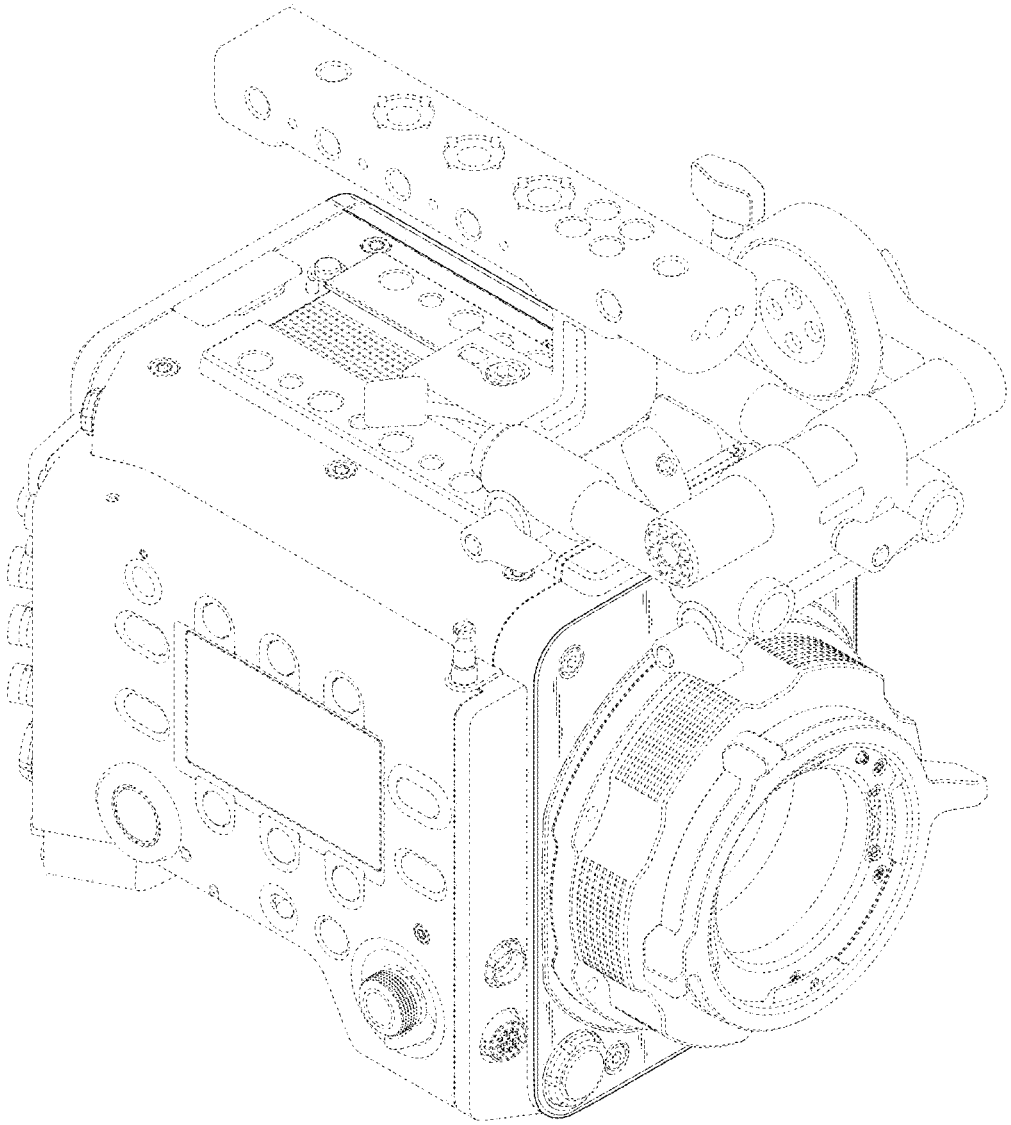
Figure 2:
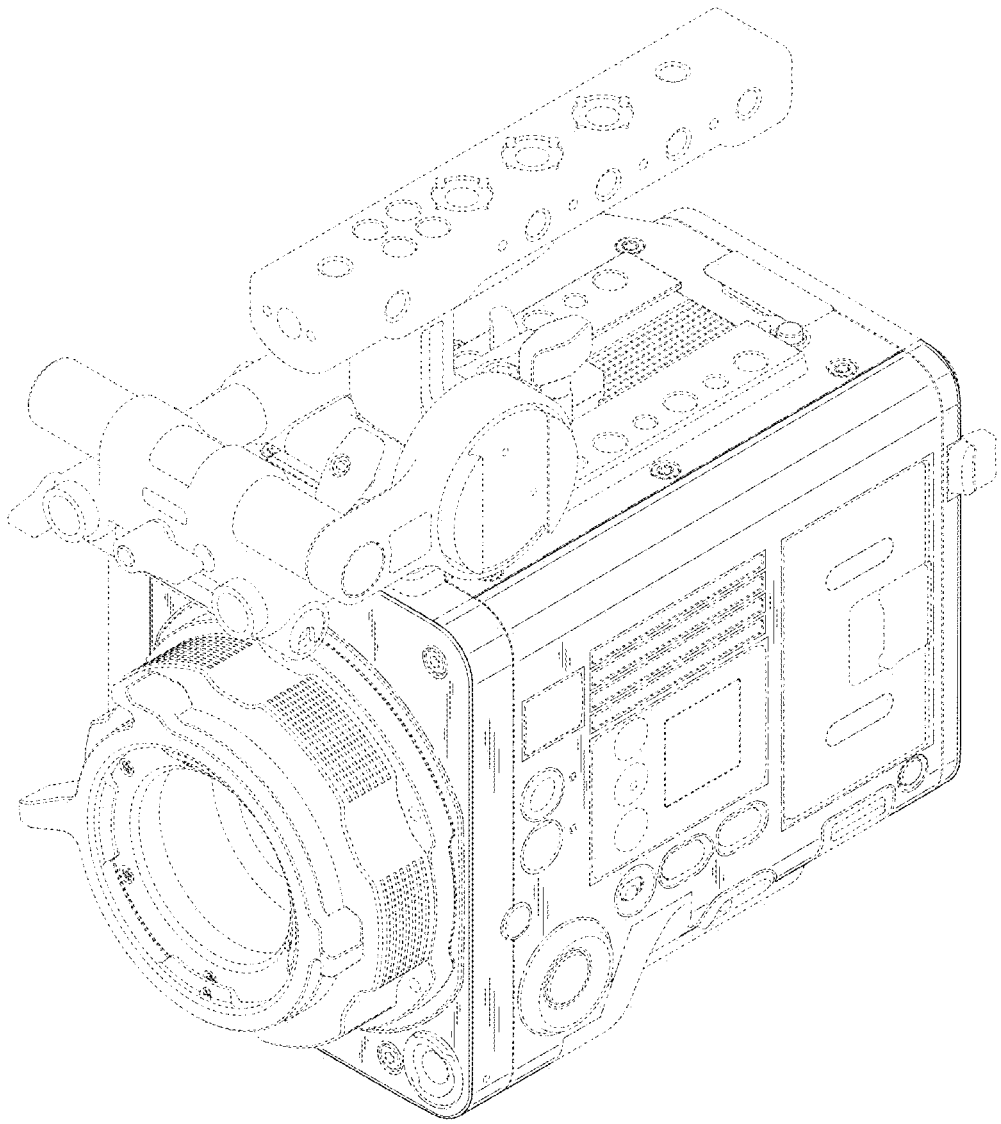
Figure 3:
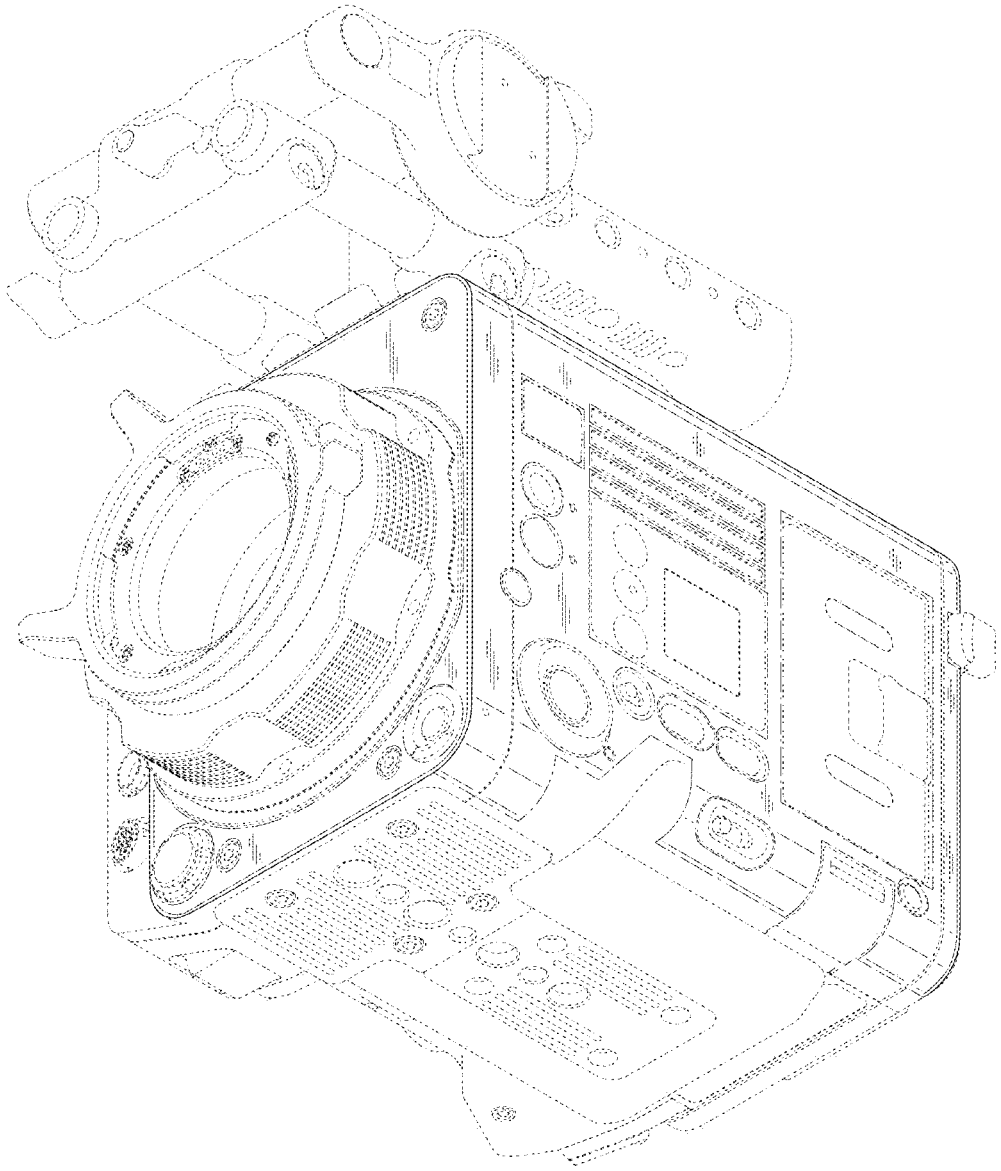
Figure 4:
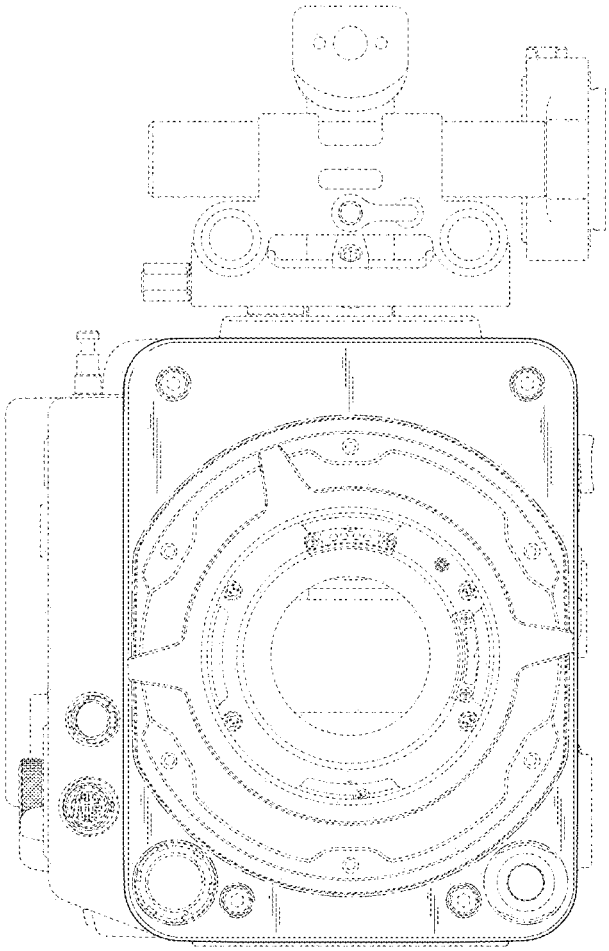
Figure 5:
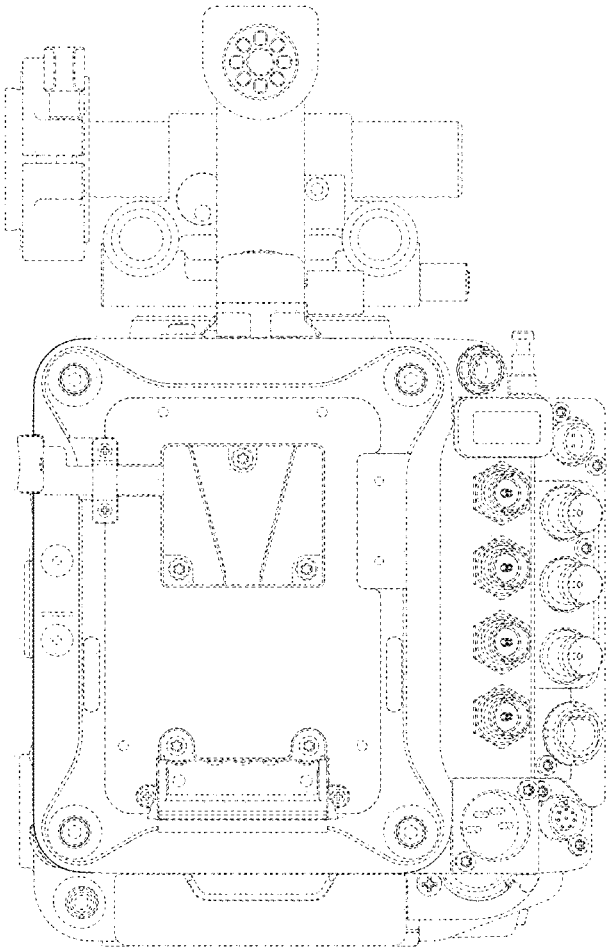
Figure 6:
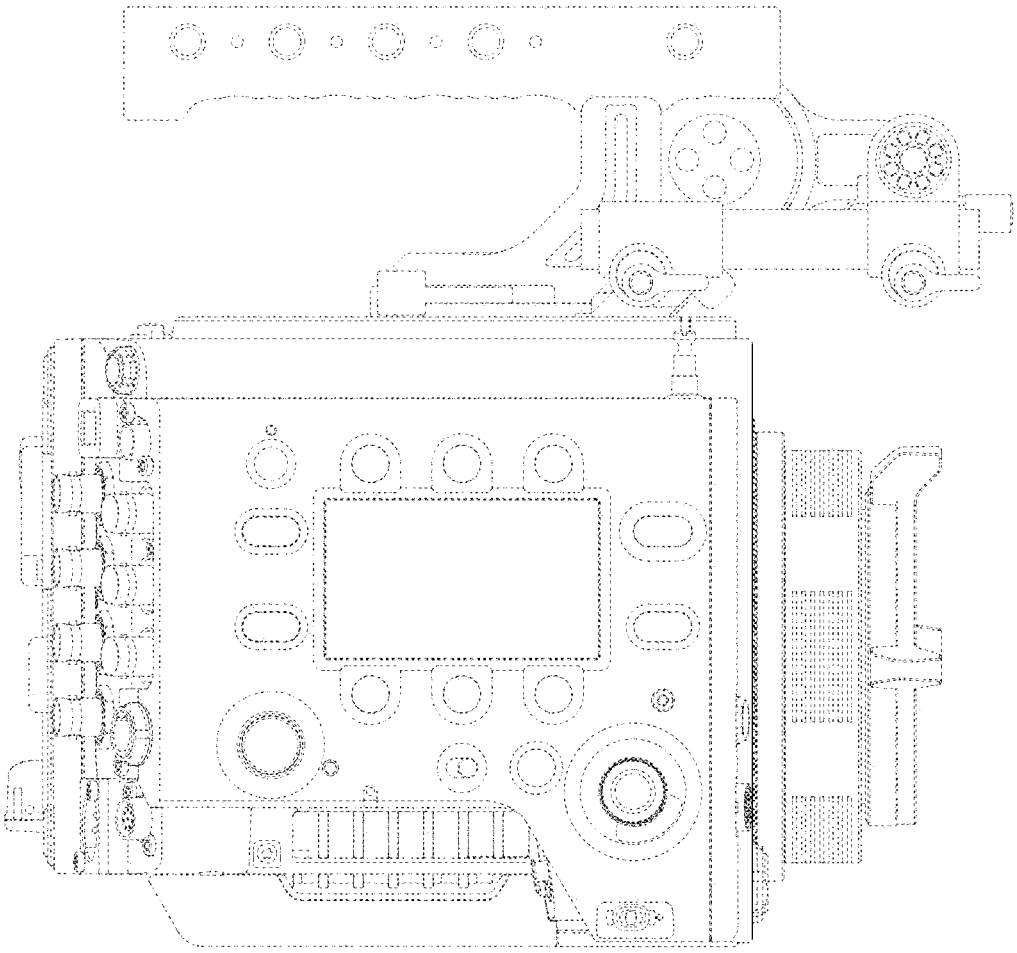
Figure 7:
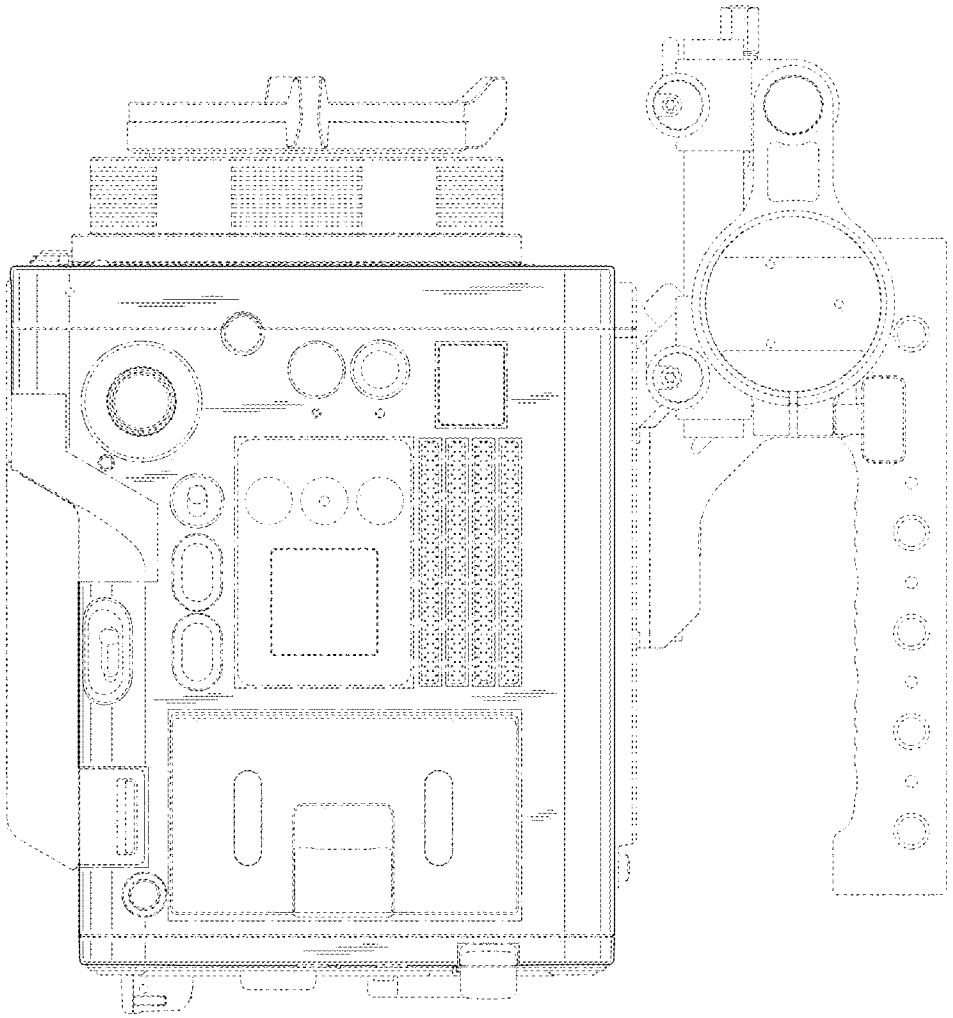
Figure 8:
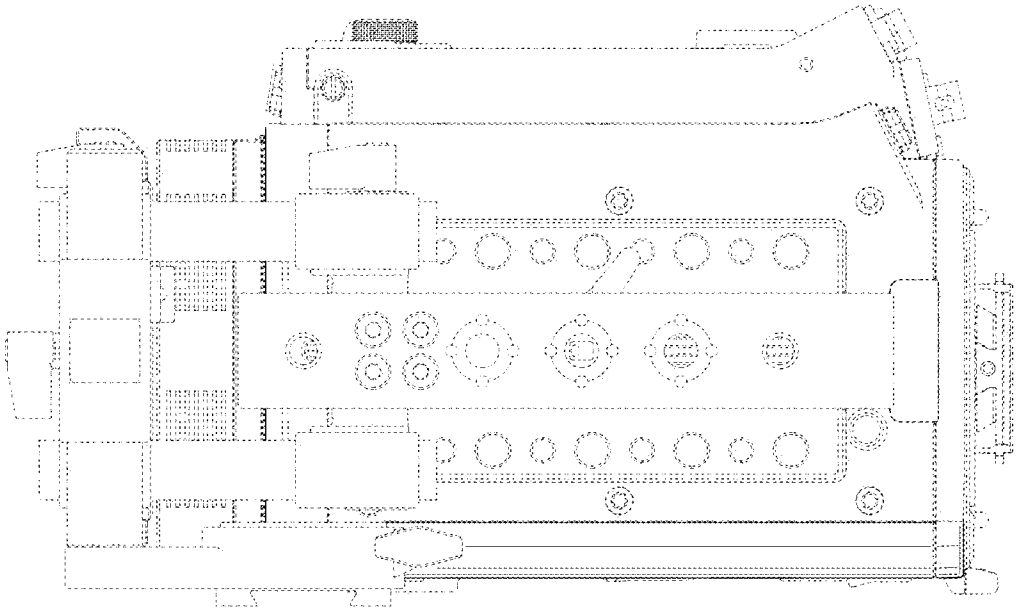
Figure 9:
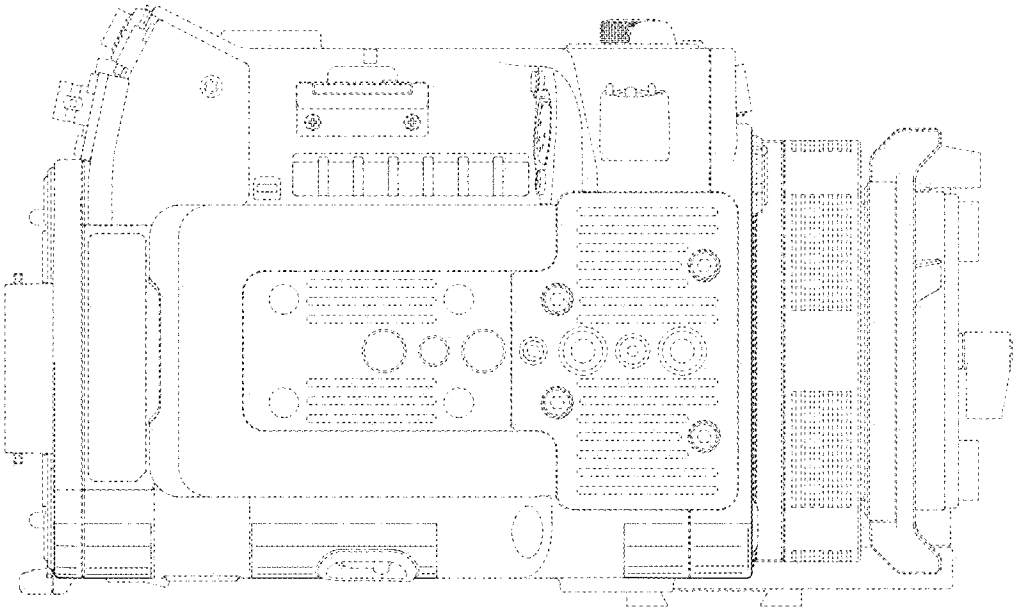

Matter enclosed in heavy brackets [ ] appears in the original patent but forms no part of this reissue; matter printed in italics indicates the additions made by reissue.

AMENDED

AMENDED

(56) References Cited

U.S. PATENT DOCUMENTS

| | | | | | |
|---|---|---|---|---|---|
| D687,477 | S | | 8/2013 | Yasutomi et al. | |
| D695,330 | S | * | 12/2013 | Shimizu | D16/202 |
| D705,843 | S | * | 5/2014 | Kawai | D16/202 |
| D739,452 | S | * | 9/2015 | Adams | D16/208 |
| D750,687 | S | * | 3/2016 | Samuels | H04N 23/667 D16/218 |
| D754,230 | S | * | 4/2016 | Mori | D16/200 |
| D809,583 | S | * | 2/2018 | Morishita | D16/202 |
| D826,305 | S | * | 8/2018 | Ahman | D16/203 |
| D840,459 | S | * | 2/2019 | Petty | D16/202 |
| D862,874 | S | * | 10/2019 | Miyazawa | D3/202 |
| D872,157 | S | * | 1/2020 | Nishiwaki | D16/202 |
| D875,156 | S | * | 2/2020 | Tanifuji | D16/202 |
| D875,805 | S | * | 2/2020 | Igarashi | D16/202 |
| D880,562 | S | * | 4/2020 | Fujita | D16/202 |
| D897,395 | S | * | 9/2020 | Arimoto | D16/202 |
| D917,603 | S | * | 4/2021 | O'Connor | D16/218 |
| D959,533 | S | * | 8/2022 | Nishimura | D16/202 |
| D1,049,199 | S | * | 10/2024 | Lim | D16/202 |
| D1,069,882 | S | * | 4/2025 | Nguyen | D16/218 |
| 2018/0278817 | A1 | * | 9/2018 | Shimizu | G03B 17/14 |
| 2019/0066467 | A1 | * | 2/2019 | Shimizu | G08B 13/12 |
| 2021/0055512 | A1 | * | 2/2021 | Yamamoto | H04N 23/52 |
| 2021/0218869 | A1 | * | 7/2021 | Nagai | H04N 23/50 |
| 2021/0337099 | A1 | * | 10/2021 | Hiroi | G03B 43/00 |

* cited by examiner

AMENDED

AMENDED

AMENDED